US008510182B2

(12) United States Patent
Pannicke et al.

(10) Patent No.: US 8,510,182 B2
(45) Date of Patent: Aug. 13, 2013

(54) SYSTEMS AND METHODS FOR MANAGING AND REPORTING FINANCIAL INFORMATION

(75) Inventors: Danny Pannicke, Heidelberg (DE); Artur Berlinger, Leimen (DE); Georg Dopf, Schwetzingen (DE)

(73) Assignee: SAP AG, Walldorf (DE)

( * ) Notice: Subject to any disclaimer, the term of this patent is extended or adjusted under 35 U.S.C. 154(b) by 1684 days.

(21) Appl. No.: 11/085,514

(22) Filed: Mar. 22, 2005

(65) Prior Publication Data
US 2005/0222945 A1 Oct. 6, 2005

Related U.S. Application Data

(60) Provisional application No. 60/554,930, filed on Mar. 22, 2004, provisional application No. 60/599,017, filed on Aug. 6, 2004.

(51) Int. Cl.
*G07B 17/00* (2006.01)
*G07F 7/10* (2006.01)
*G06Q 10/00* (2012.01)

(52) U.S. Cl.
USPC ............................... 705/30; 705/33; 705/7.36

(58) Field of Classification Search
USPC .................... 703/30, 37; 705/30, 37
See application file for complete search history.

(56) References Cited

U.S. PATENT DOCUMENTS

| | | | | |
|---|---|---|---|---|
| 1,415,904 A | * | 5/1922 | Smith | 283/57 |
| 5,689,651 A | * | 11/1997 | Lozman | 705/37 |
| 5,893,078 A | * | 4/1999 | Paulson | 705/35 |
| 5,903,881 A | | 5/1999 | Schrader et al. | |
| 6,073,104 A | * | 6/2000 | Field | 705/1 |
| 6,154,731 A | * | 11/2000 | Monks et al. | 705/36 R |
| 6,360,188 B1 | * | 3/2002 | Freidman et al. | 703/1 |
| 6,633,851 B1 | * | 10/2003 | Engler et al. | 705/21 |
| 7,117,172 B1 | * | 10/2006 | Black | 705/35 |
| 7,401,045 B2 | * | 7/2008 | Zamsky et al. | 705/37 |
| 7,587,363 B2 | * | 9/2009 | Cataline et al. | 705/40 |
| 2001/0029475 A1 | * | 10/2001 | Boicourt et al. | 705/30 |

(Continued)

FOREIGN PATENT DOCUMENTS

| | | | |
|---|---|---|---|
| EP | 1431900 A1 | * | 6/2004 |
| JP | 2003167984 A | | 6/2003 |
| JP | 2004005274 A | | 1/2004 |
| WO | WO 2004/104726 A2 | | 12/2004 |

OTHER PUBLICATIONS http://web.archive.org/web/20030207233421/www.peachtree.com/crystalreports/.*
http://www.accountantforums.com/todays-balance-t63023.html.*

(Continued)

*Primary Examiner* — Ryan Zeender
*Assistant Examiner* — Dana Amsdell
(74) *Attorney, Agent, or Firm* — Finnegan, Henderson, Farabow, Garrett & Dunner LLP

(57) ABSTRACT

Methods and system consistent with the present invention facilitate the management of financial information. Such methods and systems may receive transaction data, store the transaction data as a line item in a day ledger, receive a request for a report, the request indicating a financial figure, such as an average daily balance, to be generated over a specified time interval, and generate, substantially in real-time or during run-time per the request, a report with the financial figure over the specified time interval using data from the day ledger.

37 Claims, 16 Drawing Sheets

(56) References Cited

U.S. PATENT DOCUMENTS

| | | |
|---|---|---|
| 2001/0054034 A1 | 12/2001 | Arning et al. |
| 2002/0065752 A1 | 5/2002 | Lewis |
| 2002/0077940 A1* | 6/2002 | Riley .............................. 705/30 |
| 2002/0091597 A1* | 7/2002 | Teng ............................... 705/30 |
| 2002/0099563 A1* | 7/2002 | Adendorff et al. ................ 705/1 |
| 2003/0033225 A1* | 2/2003 | Meldahl .......................... 705/30 |
| 2003/0040988 A1* | 2/2003 | Ha et al. ......................... 705/30 |
| 2003/0135442 A1* | 7/2003 | Kumar et al. ................... 705/37 |
| 2004/0073511 A1* | 4/2004 | Beaumont et al. .............. 705/42 |
| 2005/0038721 A1 | 2/2005 | Goeckel et al. |
| 2005/0222929 A1* | 10/2005 | Steier et al. ..................... 705/35 |

OTHER PUBLICATIONS

German Patent Office Action, mailed on Dec. 21, 2005, in a related German utility model application.

* cited by examiner

SYSTEMS AND METHODS FOR MANAGING AND REPORTING FINANCIAL INFORMATION

CROSS-REFERENCE TO RELATED APPLICATION(S)

This application claims the benefit of priority to U.S. Provisional Patent Application No. 60/554,930, filed on Mar. 22, 2004 and U.S. Provisional Patent Application No. 60/599, 017, filed on Aug. 6, 2004, the disclosures of which are expressly incorporated herein by reference, in their entirety.

BACKGROUND OF THE INVENTION

I. Technical Field

The present invention generally relates to methods and systems for managing and/or reporting financial information. More particularly, and without limitation, the invention relates to methods and systems for providing key figures and reports for variable time intervals at run-time using transactional data.

II. Background Information

For many banking and insurance companies, legal requirements (e.g., Federal Reserve regulations in the United States, central or regional bank regulations in Europe, etc.) stipulate that they must provide average balances for various time intervals. In some cases, this is required to establish liquidity. As part of these requirements, they often must generate and store key figures, such as operational balance key figures or average balance key figures. In the case of average balance key figures, they may need to provide average daily balances (ADBs) based on various time intervals, such as week-to-date, month-to-date, quarter-to-date, year-to-date, etc.

Currently, most banks and insurance companies produce these key figures by working from operational data or transactional data. This data may be provided in an On-Line Transaction Processing (OLTP) system. OLTP is a type of computer processing in which the computer responds immediately to user requests. Each request is considered a transaction. OLTP may create transactional data with direct reference to operational processes and business transactions (e.g., customer requests, invoices, goods receipts, etc.). Automatic teller machines for banks are an example of transaction processing systems.

Most banks and insurance companies post-process the transactional data in an OLTP system to generate and store secondary data that provides average balances. This post-processing requires significant investment in software/hardware modifications, such as ABAP program development on OLTP systems like the R/3 ENTERPRISE system from SAP AG in Walldorf, Germany. These modifications may include creating calendar types and daily ledger-like capabilities in a special-purpose ledger (SL) from a general ledger (GL), which for reasons of performance typically stores transaction data only on a monthly basis. The calendar types and the SL provide the ability to interpret end-of-day balances and to keep track of time (e.g., number of days in a time interval, number of days till end of time interval, etc.). Once these modifications are in place, banks and insurance companies may code ADB algorithms to calculate average balances and generate analysis reports including average balance key figures.

Despite these advances, the current capabilities of such post-processing are limited. For example, it is not easy or even possible in some cases to produce reports with both operational balance key figures and average balance key figures, or reports comparing different average balance key figures because the average balance key figures are stored in a rigid, post-processing average balance ledger. As a result, the post-processing is not able to calculate average balance key figures at variable time intervals.

Alternatively, some banks and insurance companies post-process the transactional data by investing in user exit programs to calculate monthly average balances from two SLs, such as a monthly ending balance ledger and an activity average ledger. User exit programs are SAP-defined program objects where the customer can extend the coding to adapt the SAP Standard functionality in a pre-defined way. The calculation takes place during a rollup process and the results are posted to a monthly average balance ledger (i.e., a rollup ledger). This option does not give the required breadth of desired time intervals for ADBs and has performance throughput problems.

Accordingly, it would be beneficial to provide a way to produce key figures and key figure reports in an efficient and flexible manner with minimum database storage and run-time requirements.

SUMMARY OF THE INVENTION

Methods and systems consistent with the present invention may provide many kinds of key figures and reports for variable time intervals at run-time using transactional data. More particularly, methods and systems consistent with the invention may provide different average balance key figures combined with transactional key figures without it being necessary to store separate data for average balances alongside the transactional data. A user may be given the freedom and flexibility to select among the different types of key figures when requesting a report.

One exemplary aspect of the invention relates to a method of managing financial information. The method may comprise receiving transaction data, storing the transaction data as a line item in a day ledger, receiving a request for a report from a user, the request indicating financial figures to be generated over a user-specified time interval, generating, according to the request, the financial figures over the user-specified time interval using data from the day ledger, and providing the report with the generated financial figures. In one embodiment, the request for the report may be entered by a user through an interface, such as a graphical user interface. The request may include characteristics about the items to be included in the report.

Another exemplary aspect of the invention relates to a financial management system. The financial management system may include a processor; and a database, which may be adapted to store transaction data as a line item in a day ledger. The processor may be configured to perform a method comprising receiving a request for a report, the request indicating average daily balance figures to be generated over a specified time interval, and generating, in accordance with the request during run-time, the average daily balance figures over the specified time interval from the day ledger.

Another exemplary aspect of the invention relates to another financial management system. The system may comprise a transaction unit adapted to receive transaction data via a transaction communication channel, a special database connected to the transaction unit, and a reporting unit connected to the special database. The special database may store transaction data as line item data in a day ledger. The reporting unit may provide a report including an aggregate financial figure over a predetermined time interval.

The financial management system may further comprise a general database for storing general ledger information. The general database may be connected to the transaction unit and/or the special database and may be adapted to store aggregated monthly transaction data. The general database may be used to manage accounting data. Having a separate general database may reduce the access time to line item data stored in the special database. Storing line item data related to daily transactions in the special database may decrease the amount of data stored in the general database.

Another exemplary aspect of the invention relates to a computer-readable medium containing instructions to configure a processor to manage financial information. The instructions may configure the processor to receive transaction data, store the transaction data in a database in a day ledger, receive a request for average daily balance key figures, the request indicating a time interval for generating the average daily balance key figures, and generate, substantially in real-time to the receipt of the request, the average daily balance key figures over the time interval using data from the day ledger.

Additional aspects of the invention are set forth in the detailed description which follows or may be learned by practice of methods, systems, and articles of manufacture consistent with the present invention. It is understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several aspects of the invention and together with the description, serve to explain the principles of the invention. In the drawings:

FIGS. 6A-6C illustrate exemplary additional user interfaces for creating a custom report consistent with the present invention;

FIGS. 8A-8F illustrate further exemplary user interfaces for creating a custom report consistent with the present invention.

DETAILED DESCRIPTION

Reference is now made in detail to exemplary aspects of the invention, examples and embodiments of which are illustrated in the accompanying drawings. Wherever possible, the same reference numbers are used throughout the drawings to refer to the same or like parts.

In the embodiments disclosed herein, the generation of financial figures, such as ADB key figures, from transactions in a banking environment for reporting to authorities (such as the Federal Reserve or a central or regional bank authority) are described. Accounting or controlling departments in a bank generally prepare these types of reports. As one of ordinary skill in the art will appreciate, the same or similar analysis and reporting of financial information may also apply to any industry that employs transactional systems. Accordingly, features and principles of the present invention are not limited to the generation of ADB key figures in a banking environment, but are equally applicable to the management of financial information in other industries.

Methods and systems consistent with the present invention may provide various key figures and reports for variable time intervals at run-time or substantially in real-time. In accordance with one embodiment, a system for providing key figures at run-time may include a component to receive and process transaction data, a component to store a SL that accumulates single line items representing transactions in the SL on a daily basis (e.g., a day ledger), and a component to provide reports and views of key figures reflecting the transactions, such as ADBs for variable time intervals. Each line item of the day ledger may represent a posting of a transaction. The system may apply a fiscal year variant with 365 days to the day ledger. From the day ledger, the system may directly calculate relevant key figures "on the fly" and generate drill-down reports containing such figures.

In the banking sector, ADBs may be used for various calculations and other applications. For example, ADBs may be used for customer interest and fee calculations, funds transfer pricing applications, and yield and spread calculations. ADBs may also be used for SEC and regulatory reporting, financial and management reporting, and legal and management consolidations.

Figure 1A:
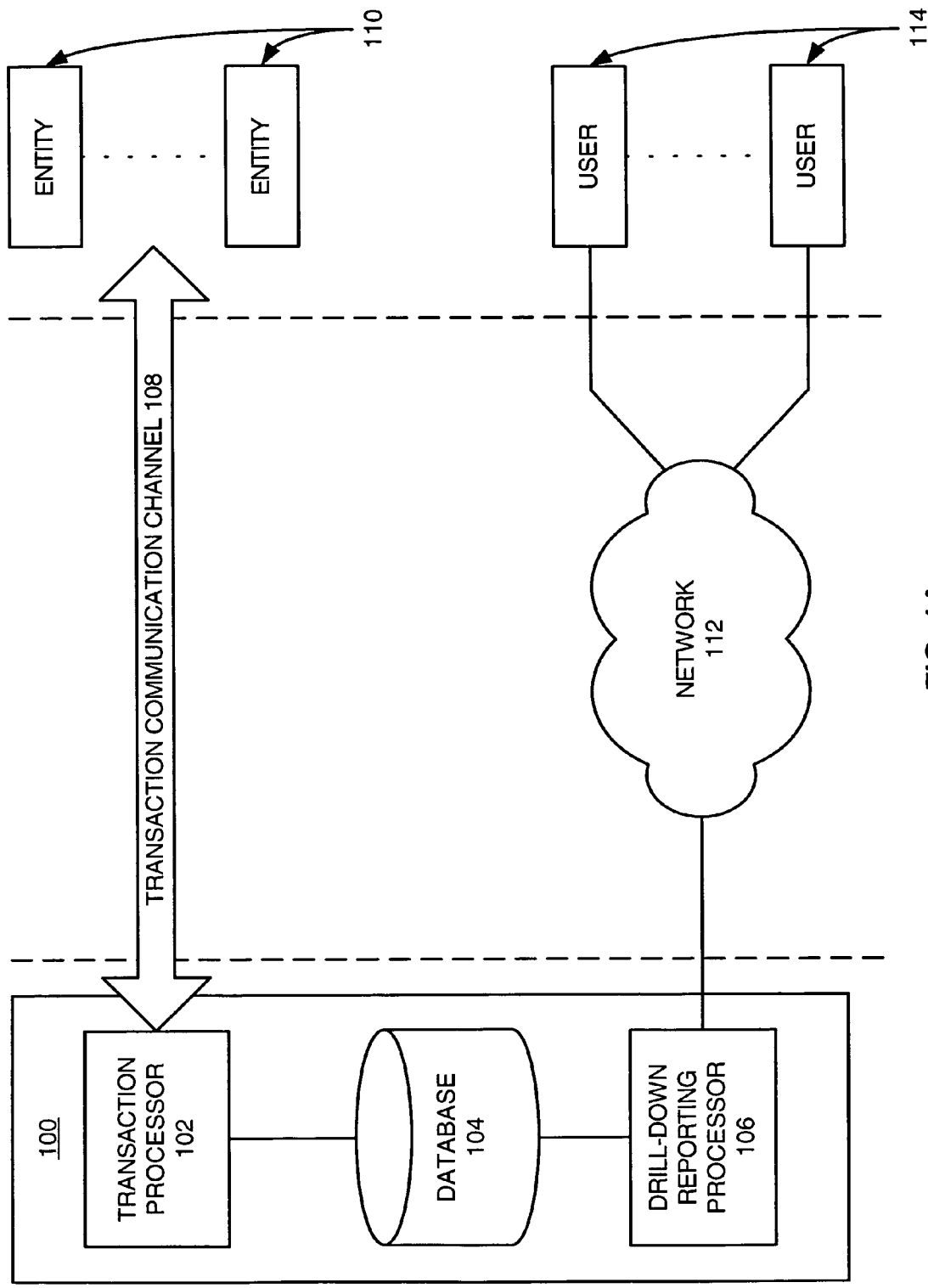
FIG. 1A illustrates an exemplary financial management system environment consistent with the present invention.

Referring now to FIG. 1A, an exemplary financial management system 100 is illustrated. Any suitable combination of hardware, software, and/or firmware may be used to implement the above components. System 100 is exemplary and other systems may comprise the aforementioned financial management system, consistent with features and principles of the present invention.

By way of a non-limiting example, FIG. 1A illustrates an exemplary system environment consistent with the invention. As shown in FIG. 1A, the exemplary system environment may include a number of components, including a transaction processor 102, a database 104, and a drill-down reporting processor 106. These components may be included within financial management system 100 and/or may be owned or operated by a business (e.g., a banking institution) that manages financial data.

Each processor 102 and 106 may include a mainframe, a laptop, a personal computer, a workstation, a computer chip, a digital signal processor board, an analog computer, a plurality of processors, or any other information processing device or combination of devices. Further, each processor 102 and 106 may be implemented by a general-purpose computer or data processor selectively activated or reconfigured by a stored computer program, or may be a specially constructed computing platform for implementing the features and operations disclosed herein. Alternatively, processors 102 and 106 may be the same processor implemented in one of any of the above forms.

As shown in FIG. 1A, financial management system 100 may receive data on transactions over a transaction communication channel 108 from one or more entities or reporting sources 110. For instance, transaction processor 102 may receive data on bank account transactions and other transactions performed by customers and/or other entities 110. An entity may include a corporation, another bank or financial institution, an internal entity, a subsidiary, a third-party procurement department, etc. For banking applications, the transactions may include withdrawals, deposits, transfers, loan acquisitions, payoffs, exchange or transfer of goods, services or funds, or any other dealings between customers and entities 110 and the bank. As will be appreciated by one of ordinary skill in the art, the exemplary system 100 may also be used in connection with other transactional and financial systems.

Transaction communication channel 108 may include a local area network, a wide area network, an intranet, an extranet, the Internet, a telephone network, a wireless network, a wired network, an ATM network, a bank network, a financial network or any other mechanism for communicating transaction information from one location to another.

Transaction processor 102 may process received transactions and store them in database 104. Database 104 may include a hard drive, a tape drive, a RAID disk array, a database system, an optical disk drive, or any other device or system that persistently stores information. For example, transaction processor 102 may execute an accounting interface in R/3 ENTEPRISE software to process posting dates of received transactions and may execute a day ledger interface in R/3 ENTEPRISE software to store the posted transaction in database 104. Transaction processor 102 may store the posted transaction as a line item in a day ledger on database 104 and/or in a month ledger on database 104. Transaction processor 102 may accumulate the line items for each day in the day ledger and store the accumulated daily totals in the day ledger on database 104. Similarly, transaction processor 102 may accumulate the line items for each month and store the accumulated monthly totals in the month ledger on database 104.

Consistent with features and principles of the invention, system 100 may allow one or more users 114, such as bank employees or members of the bank's accounting or controlling department, to access transaction data to generate reports and key figures. For example, drill-down reporting processor 106 may communicate over network 112 with each user 114 and generate reports from the day ledger and/or the month ledger stored on database 104 based on requests received from a user 114. Network 112 may include any mechanism for communicating transaction information from one location to another, including the ones listed above for transaction communication channel 108.

Drill-down reporting processor 106 may generate reports according to parameters provided by users 114. The parameters may include a selection of specific key figures and characteristics from users 114 for the report. Key figures may include an average daily balance and characteristics may include a time interval for the report. For example, drill-down reporting processor 106 may allow a user 114 to request generation of a report for the average daily balance over a user-specified time interval.

Figure 1B:
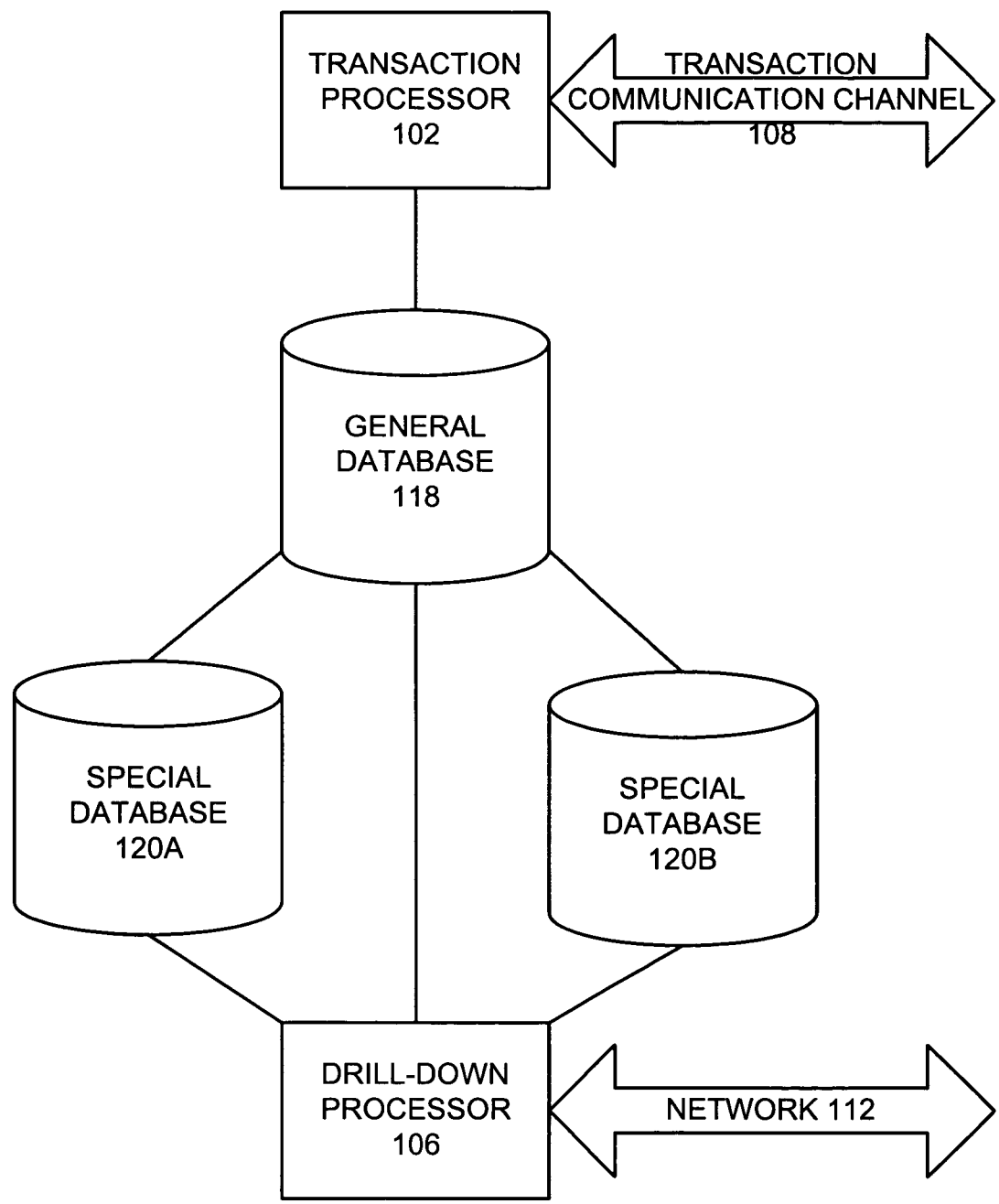
FIG. 1B illustrates another exemplary financial management system environment consistent with the present invention.

FIG. 1B illustrates another embodiment of financial management system 100 consistent with the present invention. Identical reference signs in FIGS. 1A and 1B represent similar elements. Accordingly, system 100 in FIG. 1B includes a transaction processor 102 and a drill-down reporting processor 106. System 100 in FIG. 1B may further comprise a general database 118, a first special database 120A, and/or a second special database 120B. Each of these components may be owned or operated by separate business(es) (e.g., banking institutions) that manage financial data or may be owned by a single entity.

Transaction processor 102 may include an electronic transaction unit adapted to receive transaction data via a transaction communication channel 108. Transaction processor 102 may receive transaction data from a plurality of entities (not shown) connected to system 100 via transaction communication channel 108. General database 118 may store all of the transaction data received by transaction processor 102. Transaction processor 102 may transfer the posted transactions as line items to general ledger database 118. Transaction processor 102 may periodically sum the line items for each month and may store the accumulated monthly totals in a monthly ledger on general database 118. This may reduce the amount of data stored in general database 118 and/or shorten the access time to information on general database 118.

Before transaction processor 102 sums the transaction data stored as line items on general database 118, general database 118 may transfer the transaction data to special databases 120A and/or 120B. Special databases 120A and 120B may respectively receive the transaction data for daily ledger information related to posting dates and value dates. Transaction processor 102 may then sum the line items stored in special databases 120A and/or 120B for each day and store the daily totals for various figures in a day ledger contained in special databases 120A and/or 120B.

For example, transaction processor 102 may store an end-of-day balance, an average balance for the day, and beginning-of-day balance in a day ledger on special databases 120A and/or 120B. Calculating and storing daily totals instead of line items may reduce the amount of data stored in special databases 120A and/or 120B. Similarly, the data on special databases 120A and 120B may be used to calculate year-to-date, month-to-date, and week-to-date average daily balances. The number of days for averaging the transaction data may be chosen without restriction, as long as, special databases 120A and 120B contain the appropriate daily balance information.

Figure 2:
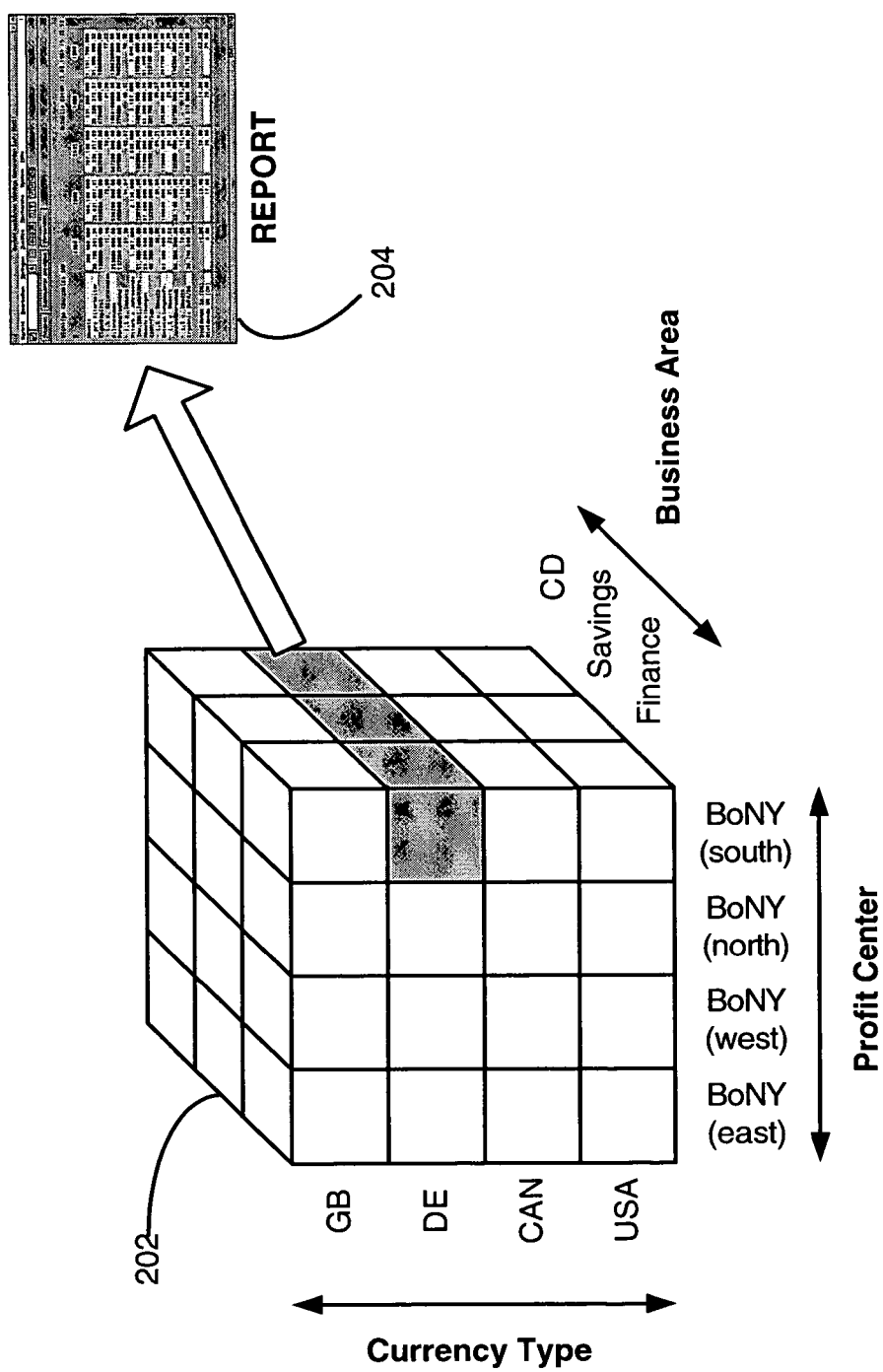
FIG. 2 illustrates an exemplary information cube for drill-down reporting consistent with the present invention.

Drill-down reporting processor 106 may generate reports according to additional characteristics selected by the user, such as currency type, company code, account number, business area, profit center, etc. Drill-down reporting processor 106 may allow a user to select characteristics that drills down information available in database 104, 118, 120A, and 120B into a specific report. For example, FIG. 2 illustrates an exemplary information cube for facilitating drill-down reporting, consistent with the present invention. Information cube 202 represents the universe of characteristics that drill-down reporting processor 106 may allow users 114 to select for a report. As shown in FIG. 2, drill-down reporting processor 106 may generate a report 204 with a currency code characteristic (such as U.S. dollar), a profit center characteristic (such as bank branch office or regional office) and a business area characteristic (such as the type of bank accounts or instruments). Although information cube 202 in FIG. 2 is only shown with three dimensions, it may have greater or fewer dimensions. Further, database 104, 118, 120A, and 120B may also use structures other than an information cube (e.g., relational database tables) to store and/or represent the universe of characteristics available for a report.

Figure 3:
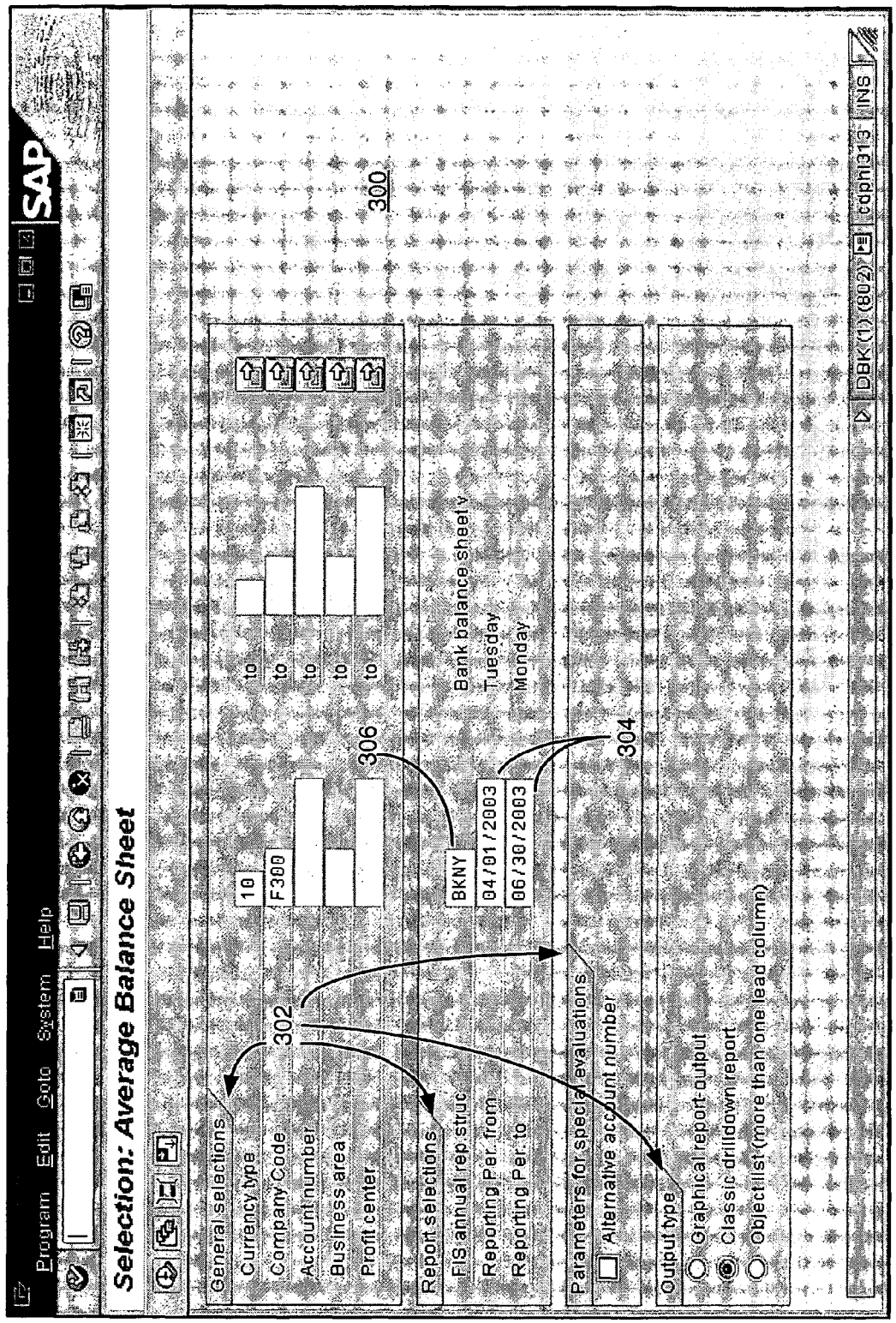
FIG. 3 illustrates an exemplary user interface for selecting parameters of a report consistent with the present invention.

In one example, drill-down reporting processor 106 may present a user interface for a user to select a report for generation. FIG. 3 illustrates an exemplary user interface 300 presented by drill-down reporting processor 106 for a user 114 to select parameters for a report. Drill-down reporting processor 106 provides characteristics 302 (e.g., currency type, company code, account number, business area, profit center, FIS annual report structure, reporting period, alternative account number, output type, etc.) that each user 114 may select for the report. For example, drill-down reporting processor 106 may receive a selected time interval 304 and type of report structure 306 from a user 114.

Figure 4:
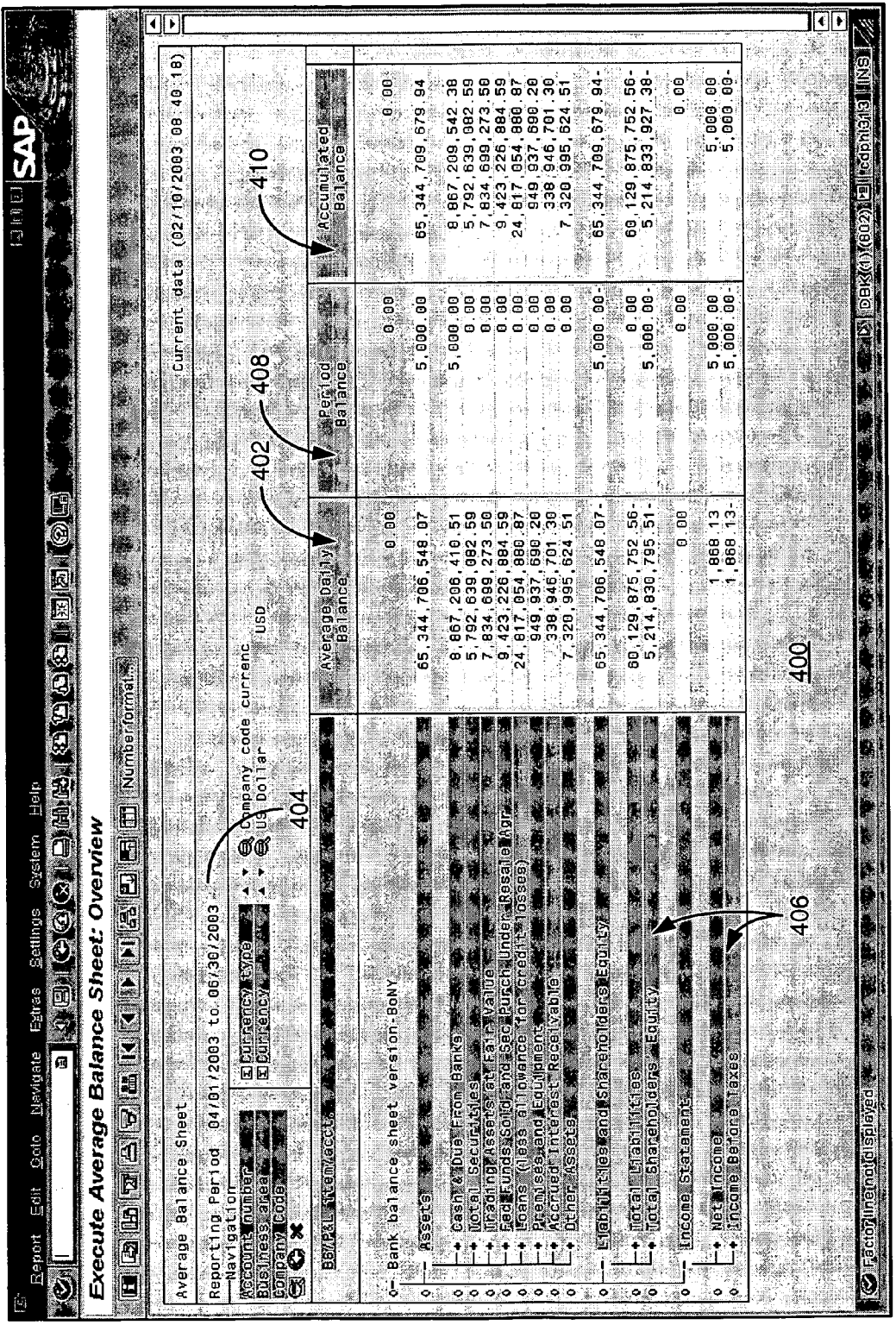
FIG. 4 illustrates an exemplary average balance sheet report consistent with the present invention.

Drill-down reporting processor 106 may generate an average balance sheet, such as the exemplary average balance sheet 400 illustrated in FIG. 4, according to characteristics 302 (cf. FIG. 3) entered or selected by a user 114. As part of average balance sheet 400, drill-down reporting processor 106 may provide average daily balances 402 for a time interval 404. Drill-down reporting processor 106 may generate average daily balances 402 for items 406 from the daily ledger stored in database 104 (cf. FIG. 1A) or in special database 120A and 120B (cf. FIG. 1B). Further, drill-down reporting processor 106 may provide period balances 408 and accumulated balances 410 for items 406. For example and as illustrated in FIG. 4, drill-down reporting processor 106 may generate ADBs 402, period balances 408, and/or accumulated balances 410 for bank assets (e.g., cash and due from bank, total securities, trading assets at fair value, federal funds sold and securities purchased under resale agreement, loans, premises and equipment, accrued interest receivable, other assets, etc.), liabilities and shareholder equity (e.g., total liabilities, total shareholder's equity, etc.), and income statements (e.g., net income, income before taxes, etc.).

In accordance with one embodiment, drill-down reporting processor 106 may generate ADBs 402 by summing end-of-day balances and dividing the sum by the total number of days in a time interval. In other words, drill-down reporting processor 106 may calculate ADBs 402 by adding posted activities in an account from each day of a time interval (daily, monthly, quarterly, etc.) and dividing that figure by the total number of days in the time interval. Therefore, ADB is a function of aggregate balance of the time interval and the number of days in the time interval.

For example, drill-down reporting processor 106 may generate ADBs 402 according to the following:

$$ADB = \frac{AGB}{NOD}$$

where AGB is the aggregate balance over time interval 404, and NOD is the number of days in time interval 404. Drill-down reporting processor 106 may calculate the AGB by summing every end-of-day balance in the day ledger over a time interval, as shown below:

$$AGB = \sum_{t \subset T} EoDB_t$$

where $EoDB_t$ is the end-of-day balance for day t, and T is the set of days within time interval 404. Drill-down reporting processor 106 may use the posting dates or cash dates of transactions as the baseline dates for determining the AGB, NOD, and ADB.

Alternatively, drill-down reporting processor 106 may compute the aggregate balance by adding the AGB of the previous day to the current day's end-of-day balance:

$$AGB_t = AGB_{t-1} + EoDB_t$$

where $AGB_t$ is aggregate balance at day t, $AGB_{t-1}$ is the aggregate balance at day (t−1), and $AGB_t$ at t=1 is the end-of-day balance for the first day of time interval 404.

Daily transaction postings to ledger accounts impact not only the end-of-day balance at the posting date, but also the end-of-day balances of future dates. Further, daily transaction postings affect the end-of-day balance of a transaction's current period (e.g., month in which transaction was posted), as well as all future periods (e.g., quarter or year in which transaction was posted). For example, the beginning balance for an account in January may be 100 dollars. Accordingly, drill-down reporting processor 106 may set the daily balances and monthly balances for all days and months of the year to 100 dollars. The logic is that, unless there is activity in this account, the balances remains the same and does not need to be updated. Following that logic (and in it's simplest form), drill-down reporting processor 106 may calculate the aggregate balance for each month by multiplying the beginning balance by the number of the days in the month: The January aggregate balance would be 3100 dollars, the February aggregate would be 2800 dollars (2900 dollars in a leap year), etc. Therefore, when each month's aggregate balance is divided by its respective number of the days in the month, the result is 100 dollars. Since there has not been any activity to the account, this is a correct ADB and drill-down reporting processor 106 will correctly project the balance for each day of the month to be 100 dollars.

As can be seen in the above example, one aspect of the ADB calculation is to determine the number of days in the time interval affected by a posting activity, whereby a banking calendar time interval could encompass a day, a month, a week, a quarter, a year, etc. The drill-down reporting processor 106 must be aware of the implications due to the different calendar times and apply the correct number of days for any chosen time interval. Therefore, to fulfill the ADB requirements the GL and the drill-down reporting processor 106 must be calendar aware.

For the sake of demonstration, let us continue the example above and assume a credit to the balance sheet account of 70 dollars on January $23^{rd}$. This activity posting would reduce the daily balance of 100 dollars to 30 dollars as of January $23^{rd}$ and all subsequent days of the year, but would not affect the daily balances prior to January $23^{rd}$. On January $23^{rd}$, drill-down reporting processor 106 may determine the number of days affected by the posting activity, which would be one day (on January $31^{st}$, it would be nine days). This number of days is multiplied by the amount of activity and added to the aggregate balance. For example, on January $23^{rd}$, the aggregate balance up to that day would be given by:

$$AGB_{Jan\,23} = AGB_{Jan\,22} + EoDB_{Jan\,23}$$
$$= 2200 + (100 - 70)$$
$$= 2230$$

which yields an ADB of 96.96 dollars for the first 23 days in January (i.e., month-to-date). On January $31^{st}$, the aggregate balance up to that day would be given by:

$$AGB_{Jan\,31} = AGB_{Jan\,22} + \sum_{t=Jan\,23}^{t=Jan\,31} EoDB_t$$
$$= 2200 + 9 \times (100 - 70)$$
$$= 2470$$

which yields an ADB of 79.68 dollars for the 31 days in January. Note that for all subsequent months, all of the daily balances are also affected. For example, on March $31^{st}$, the aggregate balance is 930 dollars, which yields an ADB of 30 dollars for the 31 days in March.

Further, the ADB for the quarter-to-date and year-to-date on March 31$^{st}$ would both be 47.11 dollars for the 90 days (31 days in January plus 28 days in February plus 31 days in March). In summary, today's ADB is the balance equal to today's aggregate balance divided by the number of days in the period-to-date, whereby aggregate balance is the total result of today's end-of-day balance (i.e., net balance of total credits and debits of the day) plus the prior period's aggregate balance.

Figure 5:
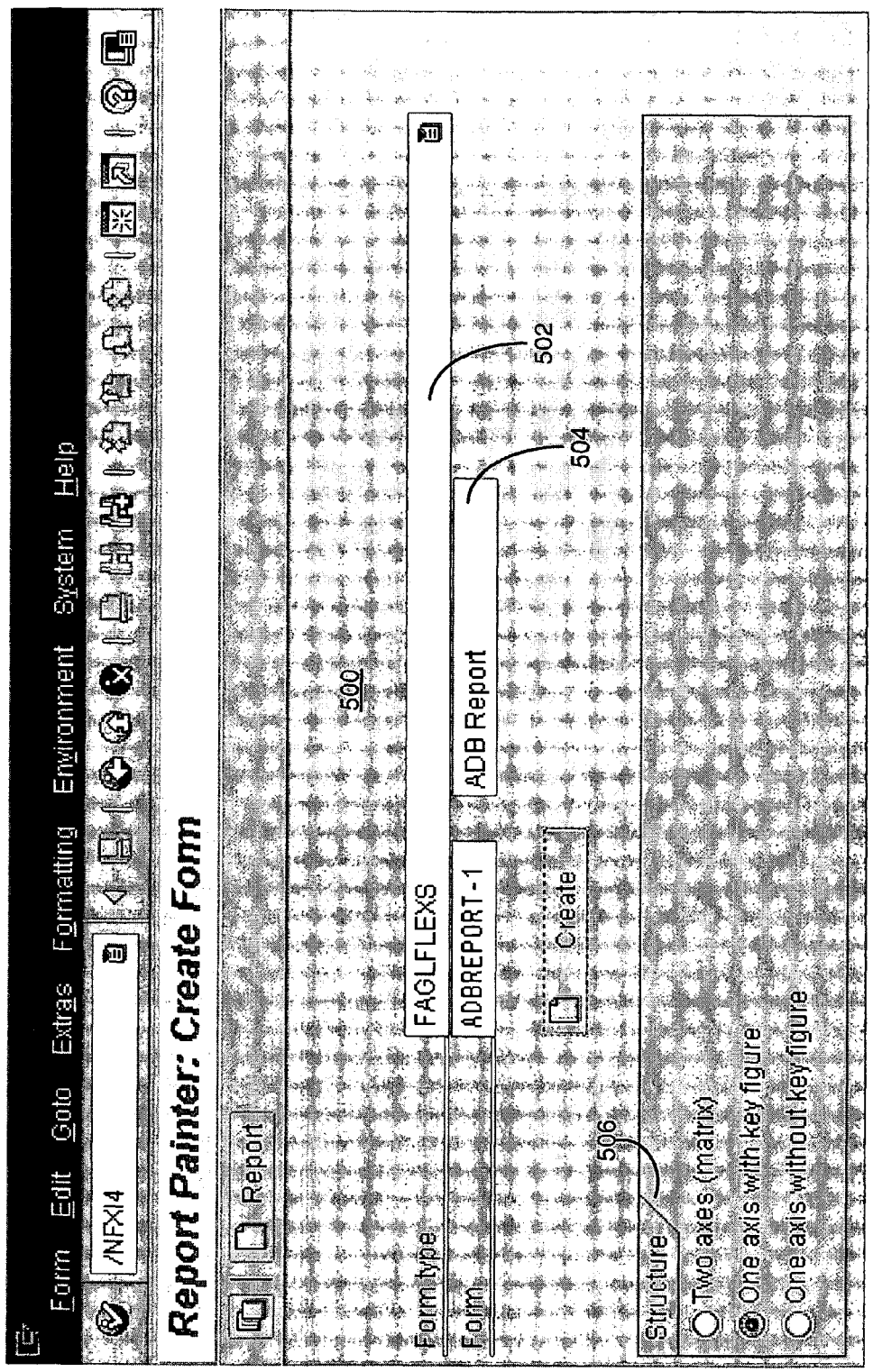
FIG. 5 illustrates an exemplary user interface for creating a custom report consistent with the present invention.
Figure 6A:
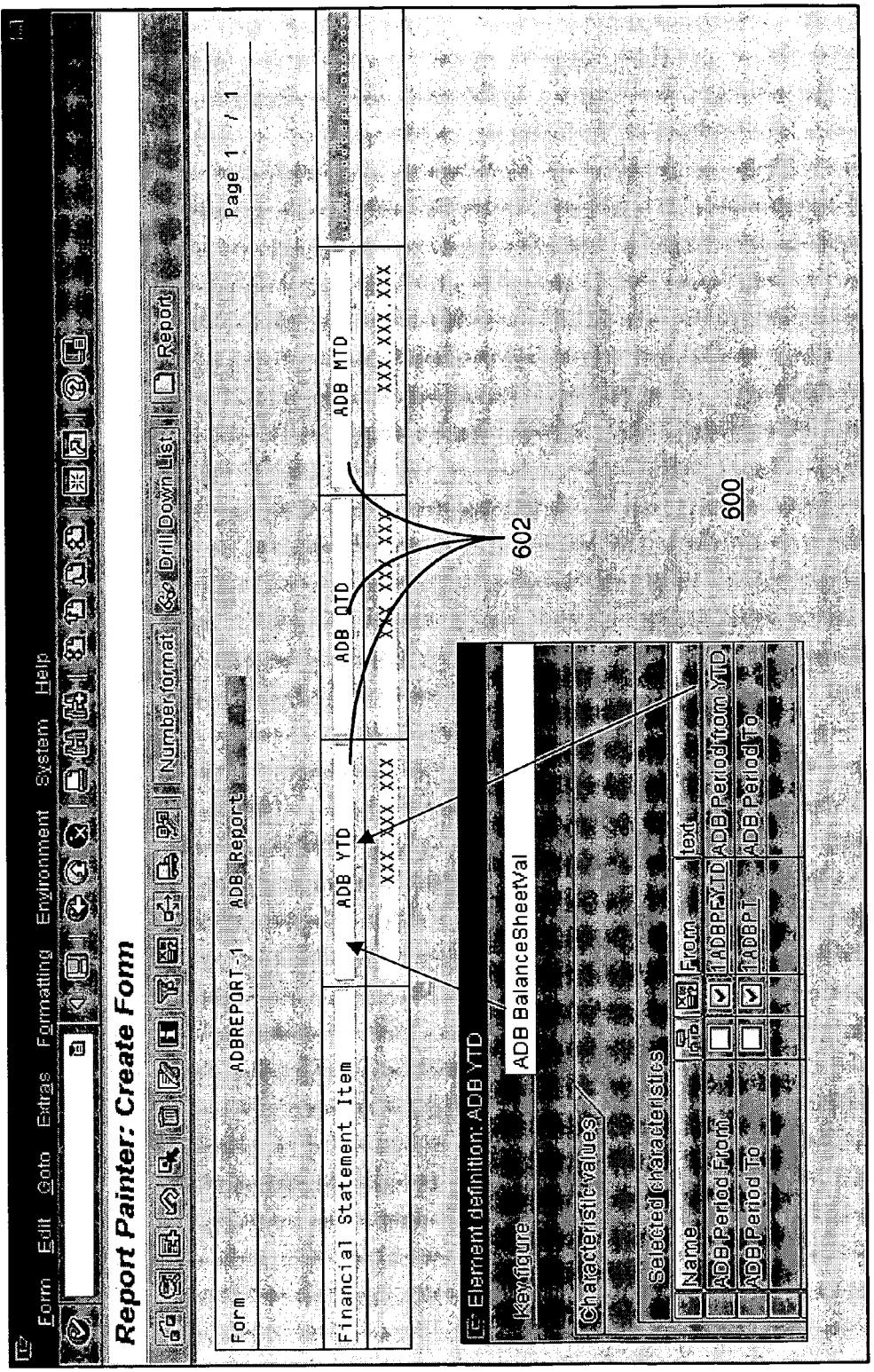
Figure 6B:
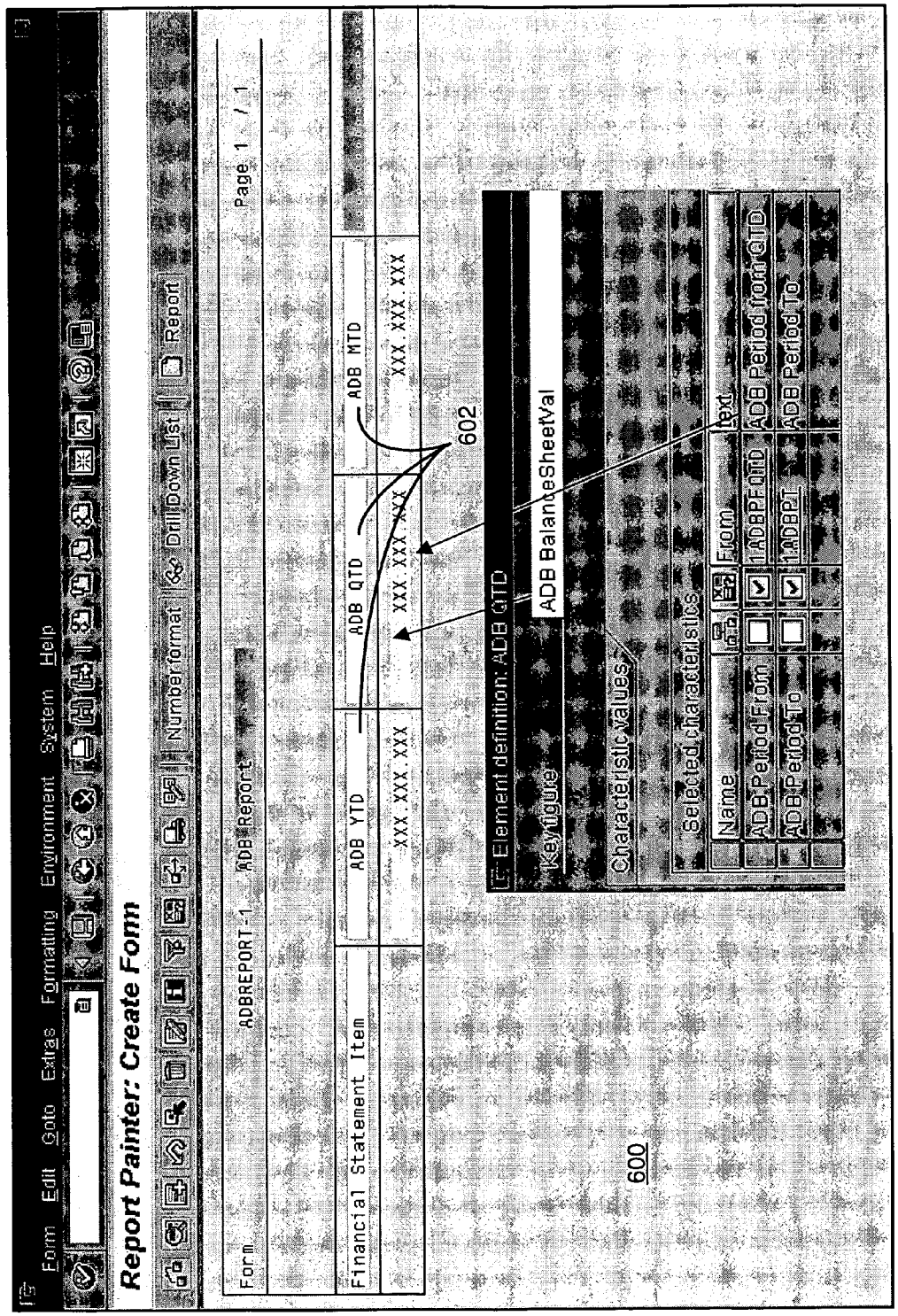
Figure 6C:
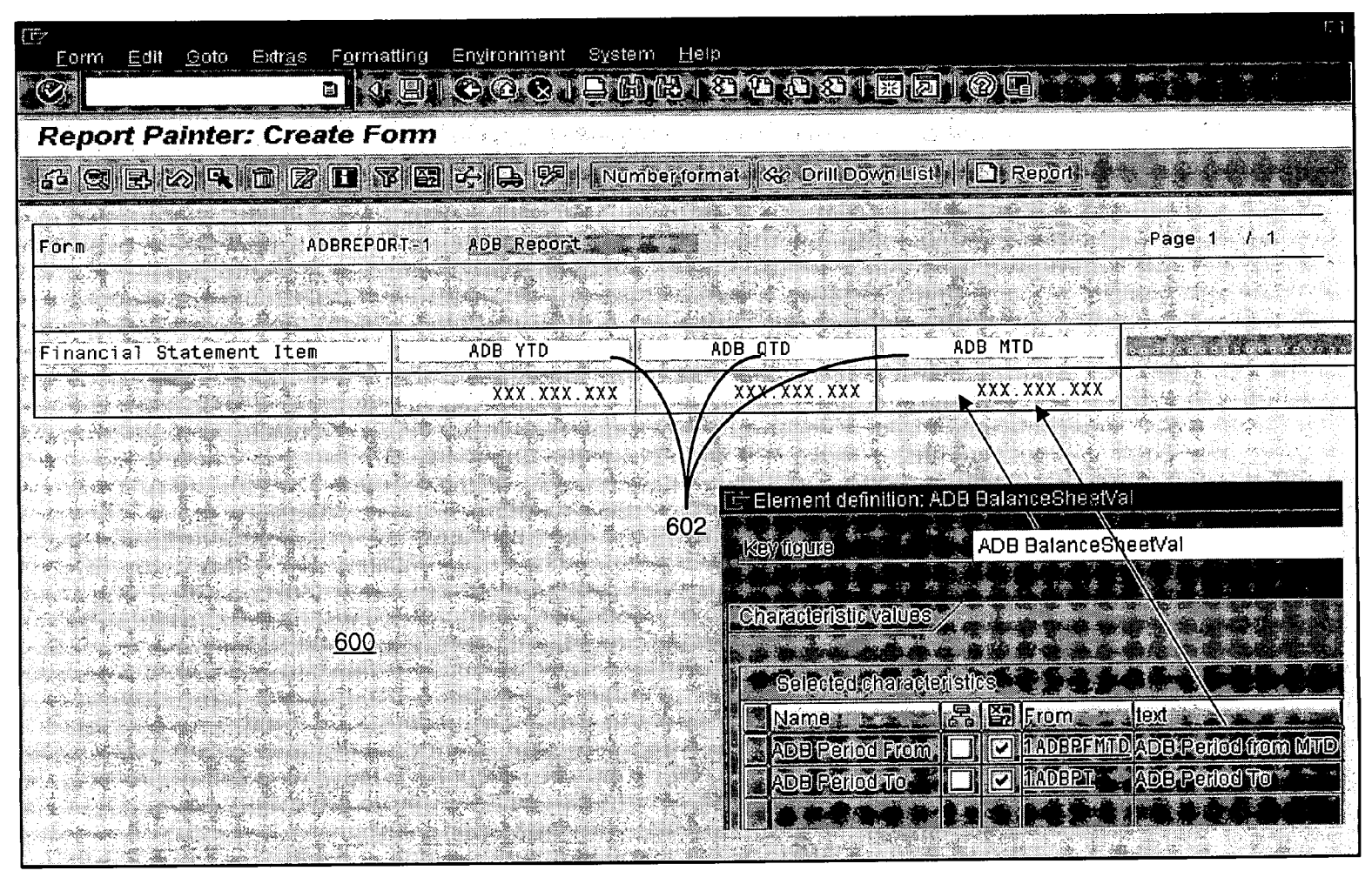

Consistent with the present invention, system 100 may provide an interface for a user to create custom reports. For example, drill-down reporting processor 106 may present a user interface, such as the exemplary user interface 500 illustrated in FIG. 5, to employee 114. Drill-down reporting processor 106 may receive data from a user 114 reflecting a form type 502, a form name 504, and/or a structure 506 for a custom report. Next, drill-down reporting processor 106 may present one or more additional interfaces, such as the exemplary user interface 600 illustrated in FIGS. 6A-6C, to user 114 to allow him/her to select and define the key figures 602 that he/she wishes to include in the custom report. In this example, a user 114 has chosen to include in the report, average daily balance key figures for three time intervals (e.g., year-to-date, quarter-to-date, and month-to-date). Drill-down reporting processor 106 may save the custom report from user 114 as a template for later use by user 114 or others.

Figure 7:
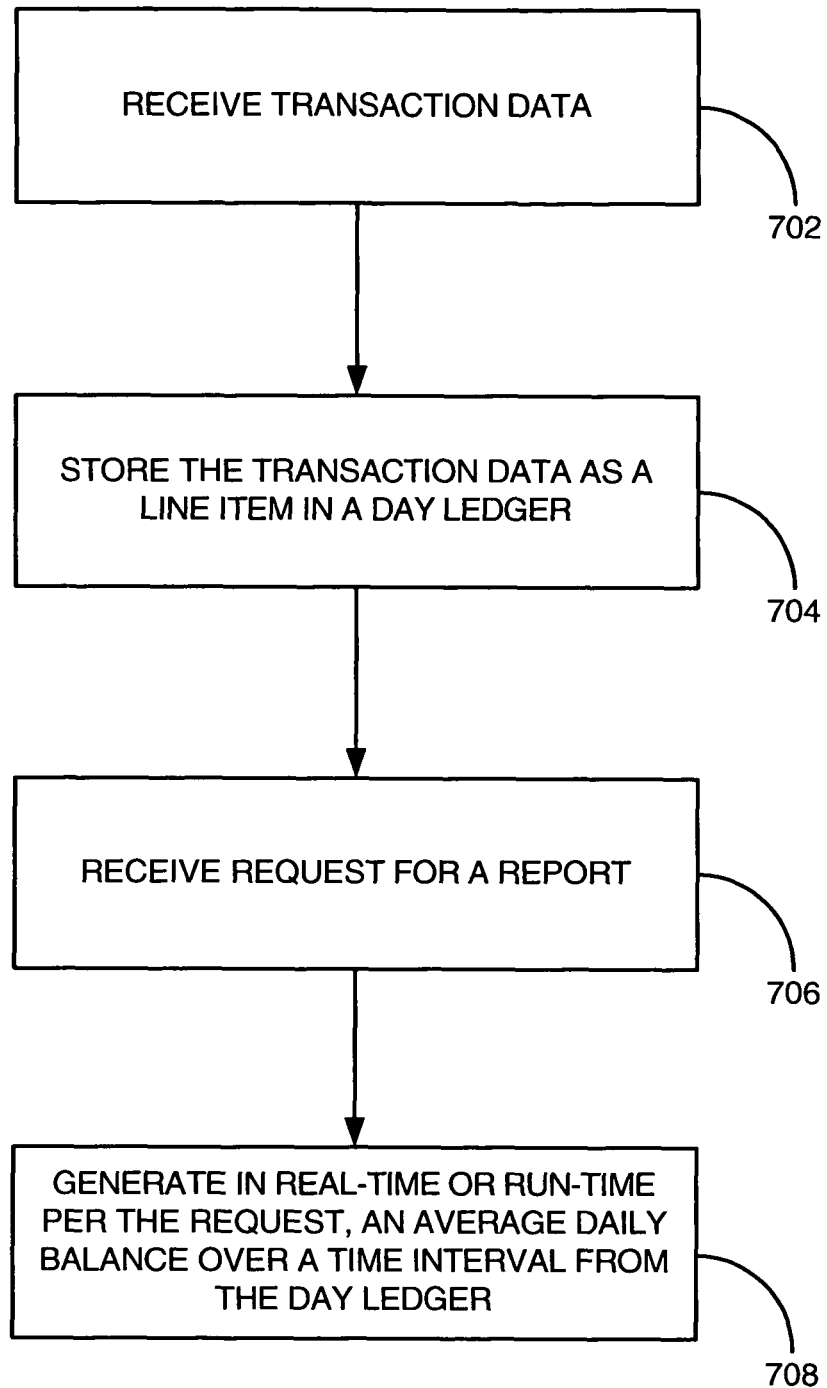
FIG. 7 illustrates an exemplary method of managing financial information consistent with the present invention.

Consistent with an embodiment of the invention, system 100 may perform a method of managing financial information, such as the exemplary method illustrated in FIG. 7. As shown in FIG. 7, transaction processor 102 may receive transaction data from a customer or entity 110 (block 702). Transaction processor 102 may receive transaction data from one or more customers or entities 110 via, for example, transaction communication channel 108. Transaction processor 102 may store received transaction data as a line item in a day ledger (block 704). Steps 702 and 704 may be performed periodically (e.g., once a day, once a week, etc.).

As discussed above, based on input from a user, drill-down reporting processor 106 may generate average daily balance(s) over one or more time intervals from the day ledger (block 706). Drill-down reporting processor 106 may generate a report including the average daily balance(s) specified by the user (block 708). The report may provide a comparison of the average daily balance over the time interval with another average daily balance over a different time interval. Drill-down reporting processor 106 may perform blocks 706 and 708 on demand in real-time or at run-time (e.g., whenever a request for a report or an average daily balance is made by a user).

For example, in one exemplary embodiment consistent with the invention, transaction processor 102 (FIG. 1A) may execute SAP R/3 ENTERPRISE software, including an R/3 accounting interface and R/3 special ledger interface. The R/3 ENTERPRISE software may receive transactional information, and may store the transactional information in a totals table and a line items table of a day ledger on database 104, or on databases 118, 120A, and 120B. The totals table may include the summed line items for each day. Further, drill-down processor 106 may execute SAP R/3 ENTERPRISE EXTENSION SET 2.0 software to allow a user to create custom reports for the display of ADBs. The custom reports may be based on forms. Exemplary custom reports may include the reports shown in FIGS. 4 and 6A.

Figure 8A:
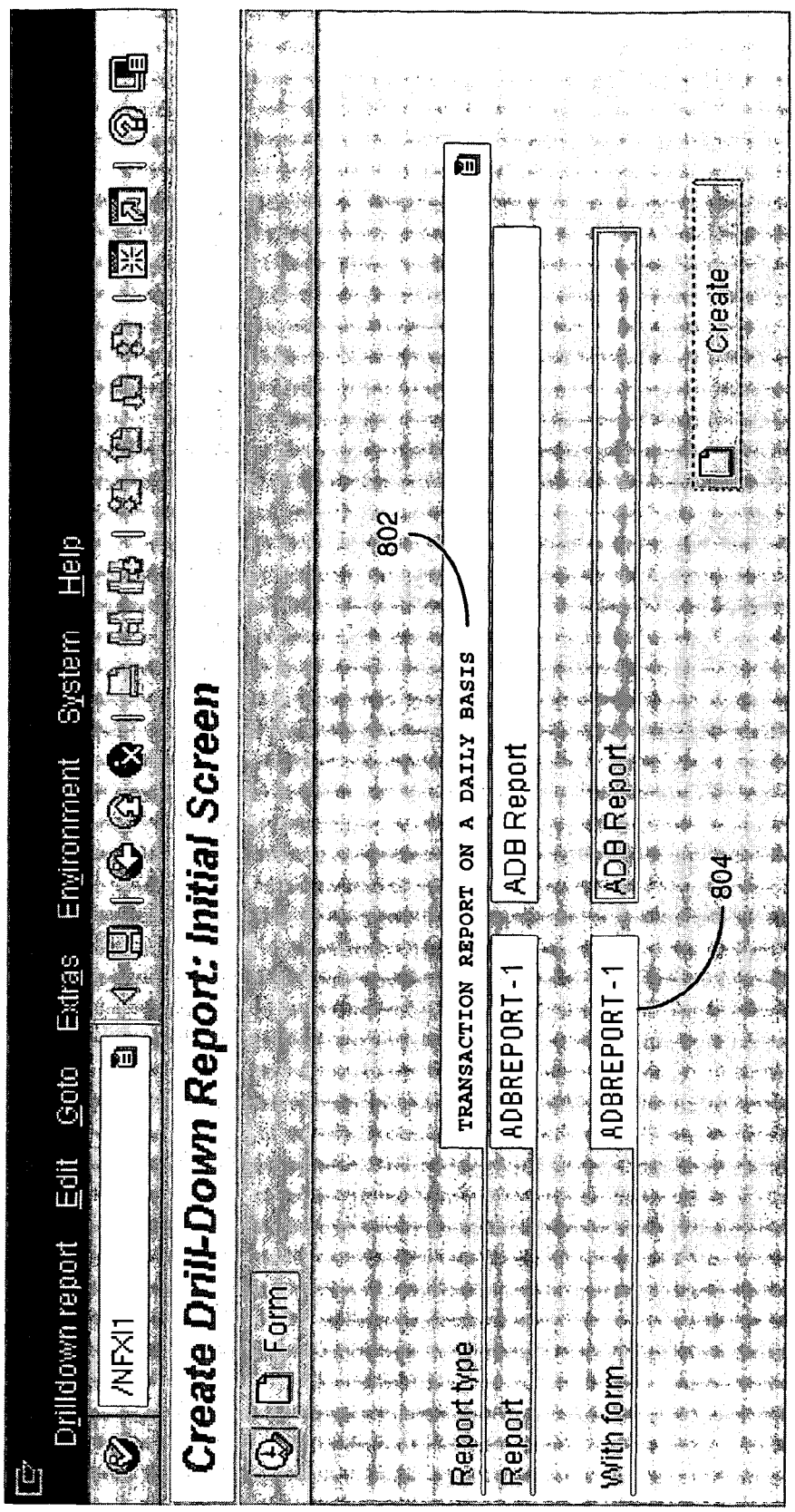

By way of example, FIG. 8A illustrates an initial user interface that drill-down processor may present to a user to create a custom "Transaction Figures on a Daily Basis" report 802 based on an ADBREPORT-1 form 804. The ADBREPORT-1 form may have general characteristics, such as "Ledger" (RLNDR), "Record Type" (RRCTY), and "Version" (RVERS). RLNDR is a specified day ledger that stores the data for ADB reporting. RRCTY is a characteristic indicating whether the data should be actual data or planned data. RVERS is a characteristic used to select the version of planned data. The planned data and actual data may be different. The general characteristics may be set with fixed values.

Figure 8B:
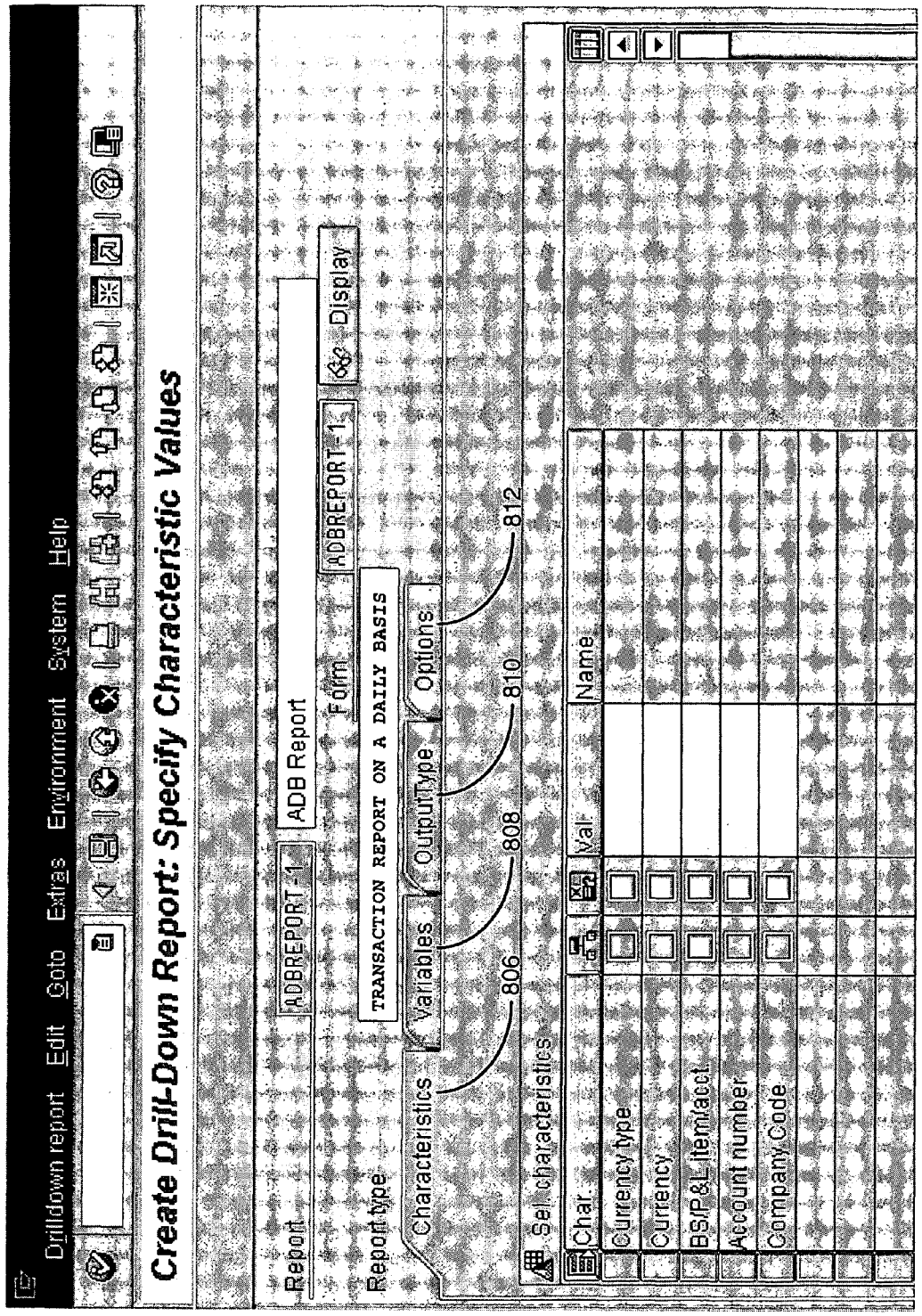
Figure 8C:
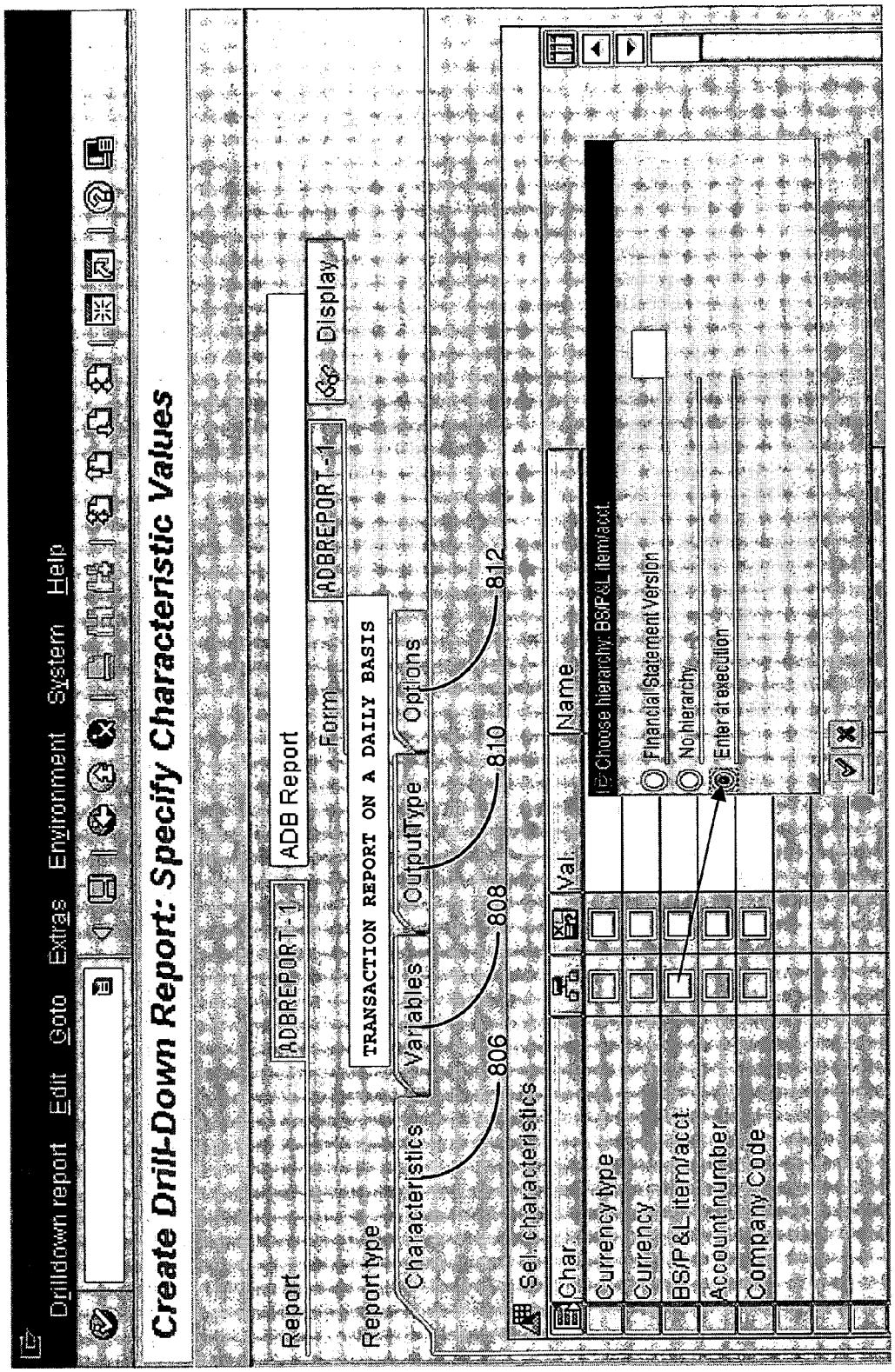

Drill-down processor 106 may provide tab pages with options for specific characteristics (e.g., characteristics 806, variables 808, output type 810, and options 812) configured to be selectable by a user when drill-down processor 106 executes the custom "Transaction Figures on a Daily Basis" report. As illustrated in FIG. 8B, characteristics 806 may include "currency type," "currency," "Balance Sheet/Profit and Loss (BS/P&L) item/account," "account number," "company code," etc. The BS/P&L structure may be a hierarchical tree with different notes and accounts on its leaves, and may define the logical structure of the ADB report. When creating the custom report, drill-down processor 106 may allow the user to indicate whether each of characteristics 806 should be based on information from a financial statement, based on a hierarchy, such as a BS/P&L tree, or no hierarchy, or entered during execution of the custom report, as illustrated in FIG. 8C.

Figure 8D:
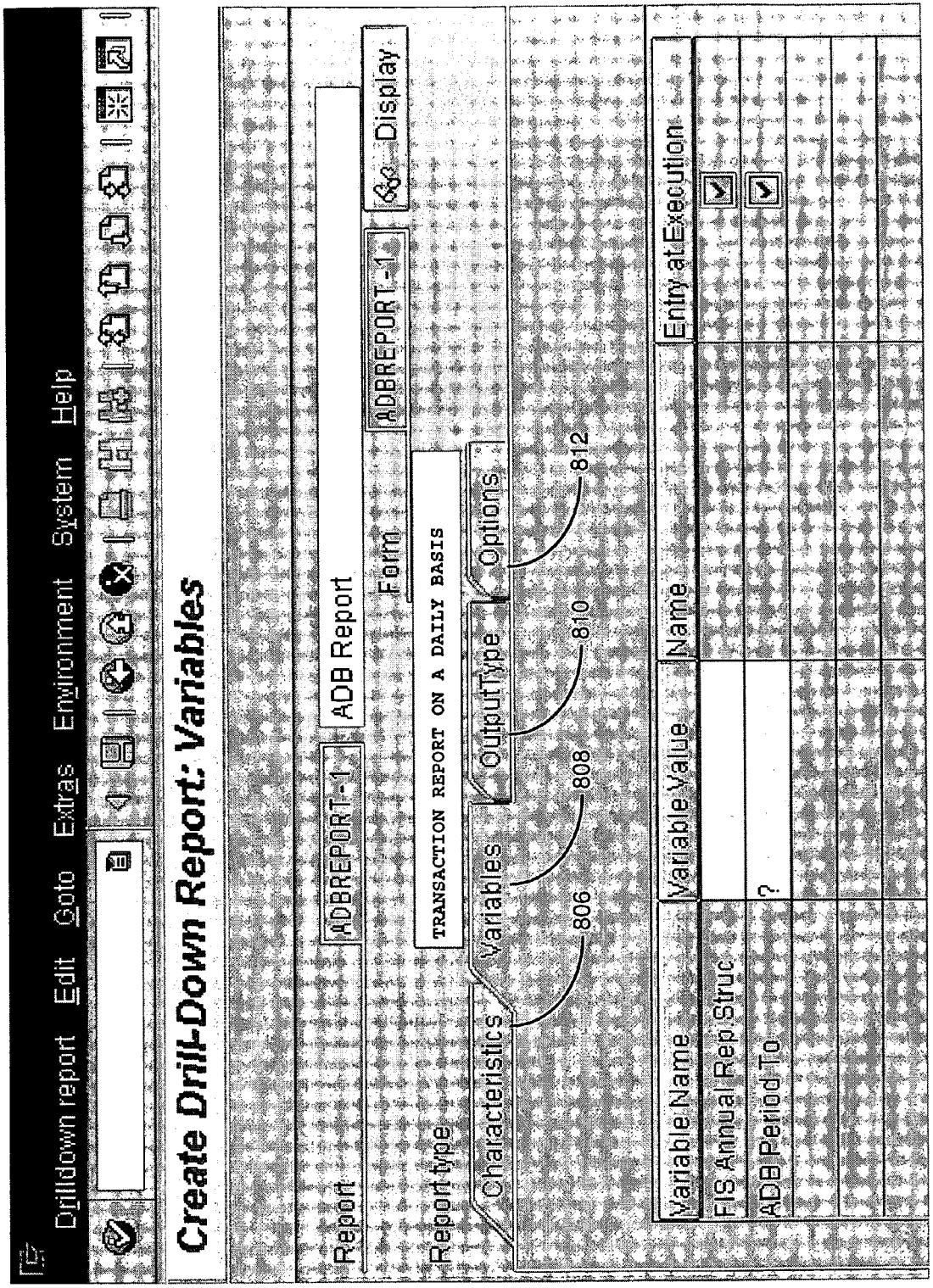
Figure 8E:
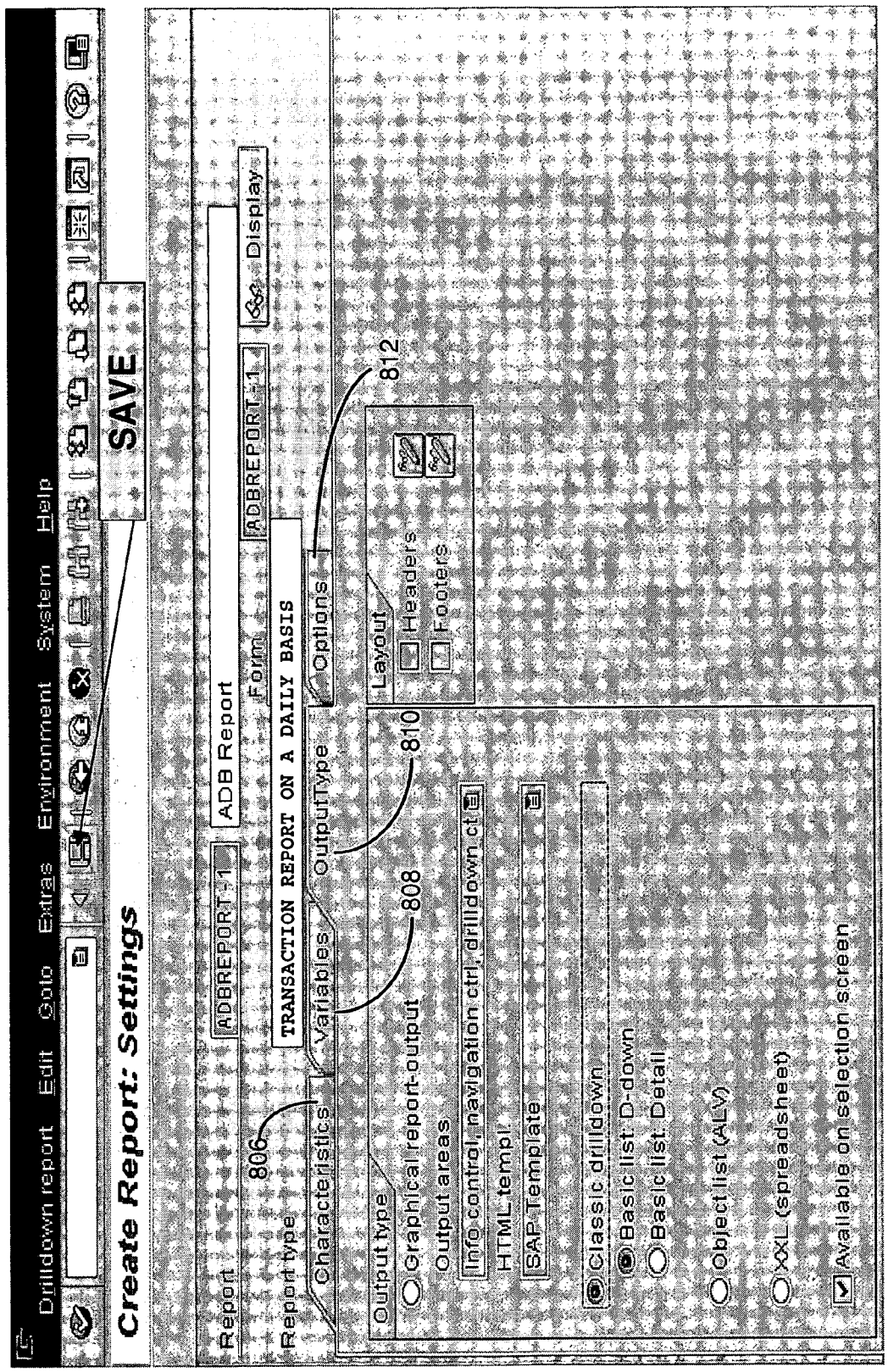

Drill-down processor 106 may also allow the user to indicate whether any values for variables 808 should be entered during execution of the custom report. Variables 808 may include an "FIS Annual Reporting Structure," an "ADB Period To," etc., as illustrated in FIG. 8D. Drill-down processor 106 may also allow the user to specify an output type 810 for the custom report. Output types 810 may include a graphical report, classic drill-down, object list, or spreadsheet, as illustrated in FIG. 8E. Drill-down processor 106 may allow the user to configure output type 810 to be available for selection when executing the custom report.

Figure 8F:
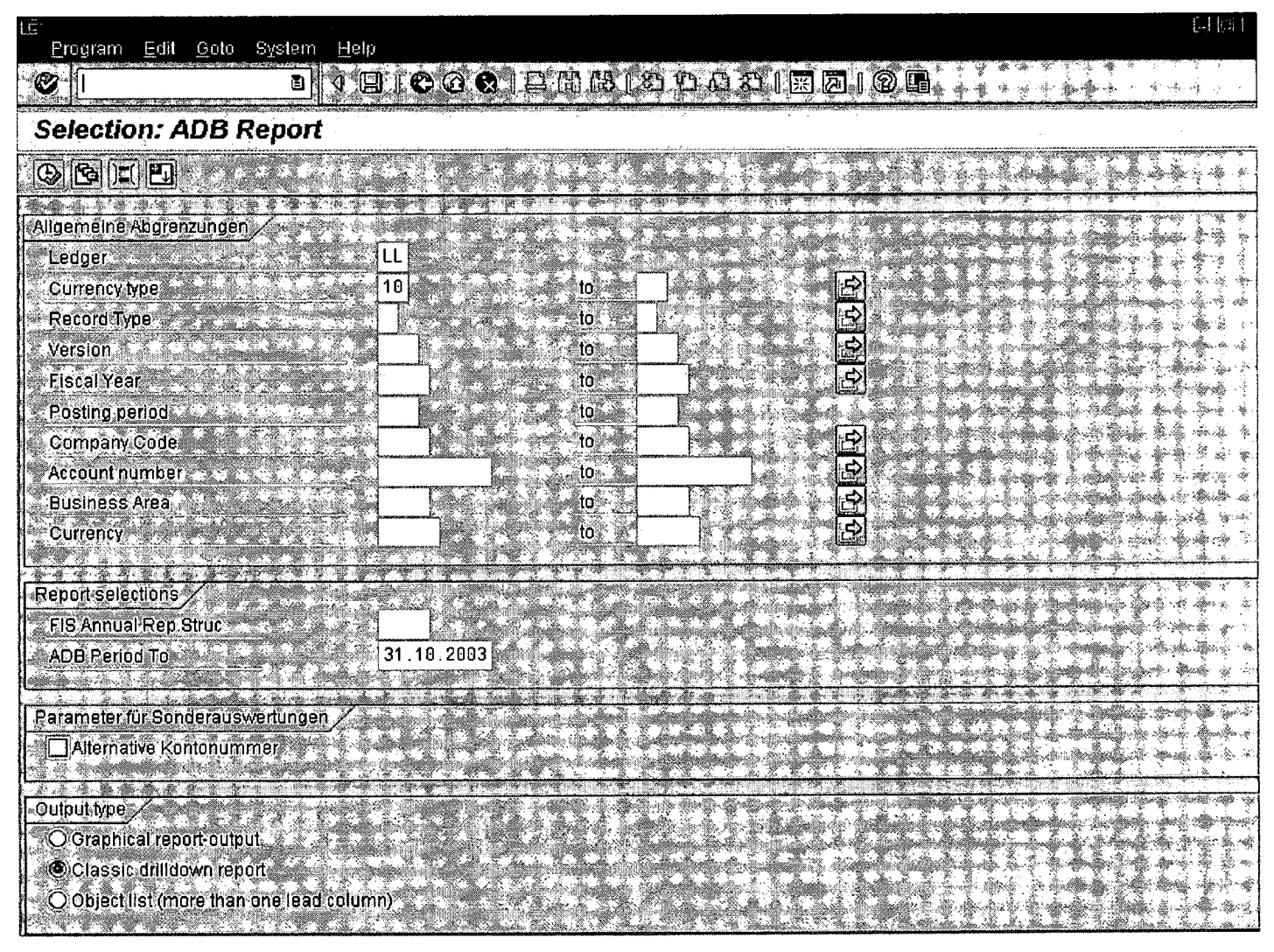

After the user creates the custom report, the user may have drill-down processor 106 save the custom report. Drill-down processor 106 may later retrieve and execute the saved custom report. Upon execution, drill-down processor 106 may present characteristics of the custom report that have been configured for selection to a user, as illustrated in FIG. 8F. The user may enter his/her choices and information for the characteristics, and drill-down processor 106 may generate an ADB report, such as average balance sheet 400 illustrated in FIG. 4, for "Transaction Figures on a Daily Basis," according to the entered choices and information.

One of ordinary skill in the art will appreciate that features and principles of the present invention may be implemented in a computer-readable medium (e.g., floppy disk, CD-ROM, storage device, etc.) containing instructions for a system, such as financial management system 100, to execute the instructions.

The embodiments and aspects of the invention set forth above are only exemplary and explanatory. They are not restrictive of the invention as claimed. Other embodiments consistent with features and principles are included in the scope of the present invention.

In the foregoing description, various features are grouped together for purposes of streamlining the disclosure. This method of disclosure is not to be interpreted as reflecting an intention that the claimed invention requires more features than are expressly recited in each claim. Rather, as the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed:

1. A computer-implemented method of managing financial information, the method comprising:
   receiving, by a transaction processor, transaction data through a program interface;
   storing the transaction data as line items in a day ledger in a database, the day ledger representing the transaction data on a daily basis, the database further storing characteristics of the transaction data in accordance with a multi-dimensional data structure;
   periodically calculating based on the transaction data and storing as part of the transaction data at least a yearly figure, a monthly figure, and a weekly figure;
   receiving a request for a report from a user, the request indicating an average daily balance to be generated over a user-specified time interval, a selection of at least one of the characteristics of the transaction data, and an output type for the report, the user-specified time interval comprising a set of days beginning on a user-specified first day and including a day for which the transaction data was stored in the day ledger;
   generating, according to the request, the average daily balance over the user-specified time interval using the transaction data from the day ledger, wherein the average daily balance is calculated by dividing an aggregate balance over the user-specified time interval by a number of days in the set of days; and
   generating the report during run-time according to the request;
   providing, by a drill-down processor, the report in the output type indicated by the request, the report comprising the generated average daily balance, average daily balance key figures, and the characteristic of the transaction data selected by the user, and the report providing a comparison of the average daily balance key figures over the user-specified time interval with other average daily balance key figures over a different time interval.

2. The method of claim 1, further comprising generating, according to the request, an end-of-day balance from the line item in the day ledger.

3. The method of claim 2, further comprising generating, according to the request, the aggregate balance from the end-of-day balance.

4. The method of claim 1, wherein the user-specified time interval is at least one of a week-to-date, a month-to-date, a quarter-to-date, and a year-to-date.

5. The method of claim 1, wherein the output type for the report is one of a graphical report, a classic drill-down report, an object list report, or a spreadsheet report.

6. The method of claim 1, further comprising structuring the characteristic of the transaction data in the report based on a hierarchical tree structure.

7. The method of claim 1, wherein the characteristics of the transaction data comprise at least one of a time interval, a currency type, a company code, an account number, a business area, a profit center, a FIS annual report structure, a reporting period, an alternative account number, or an output type.

8. The method of claim 1, further comprising generating the report substantially in real-time according to the request, the report including average daily balance key figures.

9. The method of claim 1, further comprising providing the program interface through an R/3 ENTERPRISE program.

10. A monitoring system for presenting data, the system comprising:
    one or more processors; and
    a database, the database being adapted to store transaction data as line items in a day ledger and characteristics of the transaction data in accordance with a multi-dimensional data structure, the day ledger representing the transaction data on a daily basis;
    wherein the processors are configured to:
        receive the transaction data through a program interface;
        receive a request for a report, the request indicating average daily balance figures to be generated over a user-specified time interval, a selection of at least one of the characteristics of the transaction data, and an output type for the report, the user-specified time interval comprising a set of days beginning on a user-specified first day and including a day for which the transaction data was stored in the day ledger;
        periodically calculate based on the transaction data and store as part of the transaction data at least a yearly figure, a monthly figure, and a weekly figure;
        generate, in accordance with the request during run-time, the average daily balance figures over the user-specified time interval from the day ledger, wherein the average daily balance figures are calculated by dividing an aggregate balance over the user-specified time interval by the number of days in the set of days; and
        generating the report during run-time according to the request;
        provide a user with the report in the output type indicated by the request, the report comprising the generated average daily balance, average daily balance key figures, and the characteristic of the transaction data selected by the user, and the report providing a comparison of the average daily balance key figures over the user-specified time interval with other average daily balance key figures over a different time interval.

11. The system of claim 10, wherein the processors are further configured to generate an end-of-day balance from the day ledger.

12. The system of claim 11, wherein the processors are further configured to generate the aggregate balance from the end-of-day balance.

13. The system of claim 10, wherein the user-specified time interval is at least one of a week-to-date, a month-to-date, a quarter-to-date, and a year-to-date.

14. The system of claim 10, wherein the output type for the report is one of a graphical report, a classic drill-down report, an object list report, or a spreadsheet report.

15. The system of claim 10, wherein the processors are further configured to structure the characteristic of the transaction data in the report based on a hierarchical tree structure.

16. The system of claim 10, wherein the characteristics of the transaction data comprise at least one of a time interval, a currency type, a company code, an account number, a business area, a profit center, a FIS annual report structure, a reporting period, an alternative account number, or an output type.

17. The system of claim 10, wherein the processor are further configured to provide the program interface through an R/3 ENTERPRISE program.

18. A tangible non-transitory computer-readable medium containing instructions to configure a processor to perform a method comprising:
   receiving transaction data through a program interface;
   storing the transaction data as line items in a database in a day ledger, the day ledger representing the transaction data on a daily basis;
   storing characteristics of the transaction data in accordance with a multi-dimensional data structure;
   periodically calculating based on the transaction data and storing as part of the transaction data at least a yearly figure, a monthly figure, and a weekly figure;
   receiving a request for a report of average daily balance key figures, the average daily balance key figures including an average daily balance, the request indicating a user-specified time interval for generating the average daily balance key figures and the user-specified time interval comprising a set of days beginning on a user-specified first day and including a day for which the transaction data was stored in the day ledger, the request further indicating a selection of at least one of the characteristics of the transaction data and an output type for the report;
   generating, substantially in real-time in response to the receipt of the request, the average daily balance key figures over the user-specified time interval using the transaction data from the day ledger, wherein the average daily balance is calculated by dividing an aggregate balance over the user-specified time interval by a number of days in the set of days; and
   generating the report during run-time according to the request;
   providing a user with the report in the output type indicated by the request, the report comprising the generated average daily balance, the average daily balance key figures, and the characteristic of the transaction data selected by the user, and the report providing a comparison of the average daily balance key figures over the user-specified time interval with other average daily balance key figures over a different time interval.

19. The computer-readable medium of claim 18, wherein the method further comprises generating, according to the request, an end-of-day balance from the day ledger.

20. The computer-readable medium of claim 19, wherein the method further comprises generating, according to the request, the aggregate balance from the end-of-day balance.

21. The computer-readable medium of claim 18, wherein the user-specified time interval is at least one of a week-to-date, a month-to-date, a quarter-to-date, and a year-to-date.

22. The computer-readable medium of claim 18, wherein the output type for the report is one of a graphical report, a classic drill-down report, an object list report, or a spreadsheet report.

23. The computer-readable medium of claim 1, the method further comprising structuring the characteristic of the transaction data in the report based on a hierarchical tree structure.

24. The computer-readable medium of claim 18, wherein the character selection comprises at least one of a time interval, a currency type, a company code, an account number, a business area, a profit center, a FIS annual report structure, a reporting period, an alternative account number, or an output type.

25. The computer-readable medium of claim 18, wherein the method further comprising providing the program interface through an R/3 ENTERPRISE program.

26. A system for managing financial information, comprising:
   a transaction processor for:
      receiving transaction data through a program interface via a communication channel; and
      periodically calculating based on the transaction data at least a yearly figure, a monthly figure, and a weekly figure;
   a database for:
      storing the transaction data as line items in a day ledger, the day ledger representing the transaction data on a daily basis;
      storing characteristics of the transaction data in accordance with a multi-dimensional data structure; and
      storing as part of the transaction data the yearly figure, the monthly figure, and the weekly figure; and
   a reporting processor for:
      receiving a user request for a report, the user request comprising a user-specified time interval having a set of days beginning on a user-specified first day and including a day for which the transaction data was stored in the day ledger, the user request further indicating a selection by a user of at least one of the characteristics of the transaction data and an output type for the report;
      generate an average daily balance by dividing an aggregate balance over the user-specified time interval by a number of days in the set of days, and
      generating the report during run-time according to the request;
      providing the report in the output type indicated by the request, the report comprising the generated average daily balance, average daily balance key figures, and the characteristic of the transaction data selected by the user, and the report providing a comparison of the average daily balance key figures over the user-specified time interval with other average daily balance key figures over a different time interval.

27. The system according to claim 26, wherein the database stores end-of-day balances and beginning-of-day balances.

28. The system according to claim 27, wherein the database stores at least one of an aggregate daily credit or an aggregate daily debit.

29. The system according to claim 27, wherein each line item is related to a corresponding transaction day.

30. The system according to claim 29, wherein the transaction day of each line item is either a value date or a posting date of a transaction.

31. The system according to claim 30, further comprising a second database, wherein the first database relates each line item to a respective posting date and the second database relates each line item to a respective value date.

32. The system according to claim 26, further comprising a second database for storing general ledger information and aggregated monthly transaction data.

33. The system according to claim 26, wherein the reporting processor calculates the number of days contained in the user-specified time interval.

34. The system according to claim 33, wherein the reporting processor generates the aggregate balance by adding the transaction data from the user-specified time interval.

35. The system according to claim 26, wherein the output type for the report is one of a graphical report, a classic drill-down report, an object list report, or a spreadsheet report.

36. The system according to claim 26, wherein the reporting processor further structures the characteristic of the transaction data in the report based on a hierarchical tree structure.

37. The system of claim 26, wherein the transaction processor further provides the program interface through an R/3 ENTERPRISE program.

* * * * *